United States Patent
Paller (10) Patent No.: US 10,799,065 B2
(45) Date of Patent: Oct. 13, 2020

(54) THERMOCOUPLE FOR MEASURING COOKWARE TEMPERATURE

(71) Applicant: Haier US Appliance Solutions, Inc., Wilmington, DE (US)

(72) Inventor: Hans Juergen Paller, Louisville, KY (US)

(73) Assignee: Haier US Appliance Solution, Inc., Wilmington, DE (US)

( * ) Notice: Subject to any disclaimer, the term of this patent is extended or adjusted under 35 U.S.C. 154(b) by 183 days.

(21) Appl. No.: 16/128,618

(22) Filed: Sep. 12, 2018

(65) Prior Publication Data

US 2020/0077838 A1 Mar. 12, 2020

(51) Int. Cl.
| | | |
|---|---|---|
| *G01K 7/00* | (2006.01) | |
| *G01K 1/00* | (2006.01) | |
| *A47J 36/32* | (2006.01) | |
| *G01K 13/00* | (2006.01) | |
| *G01K 7/08* | (2006.01) | |

(52) U.S. Cl.
CPC .............. *A47J 36/321* (2018.08); *G01K 7/08* (2013.01); *G01K 13/00* (2013.01); *A47J 2202/00* (2013.01)

(58) Field of Classification Search
USPC ........... 374/141, 179, 208, 149, 180; 99/342
See application file for complete search history.

(56) References Cited

U.S. PATENT DOCUMENTS

| | | | | |
|---|---|---|---|---|
| 4,447,710 A | * | 5/1984 | McWilliams | ........ H05B 1/0266 219/448.14 |
| 5,620,255 A | | 4/1997 | Cook, III | |
| 6,246,033 B1 | * | 6/2001 | Shah | ........ A47J 27/62 219/447.1 |
| 10,222,070 B2 | * | 3/2019 | Cadima | ........ F24C 3/12 |
| 2014/0295357 A1 | * | 10/2014 | McAfee | ........ H05B 6/12 431/6 |
| 2016/0084506 A1 | * | 3/2016 | Rickert | ........ F24C 3/126 126/42 |
| 2017/0105248 A1 | * | 4/2017 | Dolinski | ........ H05B 1/0266 |
| 2017/0325293 A1 | | 11/2017 | Bach et al. | |

FOREIGN PATENT DOCUMENTS

| | | |
|---|---|---|
| CN | 206062927 U | 4/2017 |
| JP | 2009144985 A * | 7/2009 |

* cited by examiner

*Primary Examiner* — Mirellys Jagan
(74) *Attorney, Agent, or Firm* — Dority & Manning, P.A.

(57) ABSTRACT

A cooking appliance having a thermocouple for measuring the temperature of an electrically conducting cooking utensil is provided. The cooking appliance includes a first probe formed of a first electrically conducting material and a second probe formed of a dissimilar second electrically conducting material. The first probe and second probe are spaced from one another. When the cooking utensil is placed on a heating assembly and heat is applied thereto, the first probe and the second probe electrically contact the cooking utensil. The cooking utensil acts as an intermediate material and completes the thermocouple circuit thereby allowing current to flow between the probes. Consequently, a voltage differential is produced. The voltage differential is measured, and as the voltage differential is indicative of the temperature of the cooking utensil, the temperature of the cooking utensil may be determined.

19 Claims, 6 Drawing Sheets

THERMOCOUPLE FOR MEASURING COOKWARE TEMPERATURE

FIELD OF THE INVENTION

The present subject matter relates generally to temperature measurement devices for cooking appliances.

BACKGROUND OF THE INVENTION

Cooking appliances, such as e.g., cooktop and range appliances, typically include one or more heating assemblies for heating cooking utensils or cookware. For instance, a cooktop appliance may include a plurality of gas burners or electric heating elements. In many instances, it is desirable to measure the temperature of a cooking utensil positioned on such heating assemblies, e.g., for improved cooking performance.

Numerous attempts to measure the temperature of cooking utensils have been made. For instance, some cooking utensils include an embedded temperature sensor that utilizes radio transmitters to transmit the temperature readings to a processing device such that the temperature may be displayed. Use of external temperature sensors have also been used to measure the temperature of cooking utensils. However, such conventional solutions are either expensive and/or slow to respond and are therefore limited in their availability and usefulness.

Accordingly, a cooking appliance and temperature measuring device thereof that address one or more of the challenges noted above would be useful.

BRIEF DESCRIPTION OF THE INVENTION

Aspects and advantages of the invention will be set forth in part in the following description, or may be apparent from the description, or may be learned through practice of the invention.

In a first exemplary embodiment, a cooking appliance is provided. The cooking appliance includes a heating assembly having a heating element for heating a cooking utensil formed of an electrically conducting material. The cooking appliance also includes a thermocouple. The thermocouple includes a first probe formed of a first electrically conducting material. The thermocouple also includes a second probe spaced from the first probe and formed of a second electrically conducting material that is different than the first electrically conducting material of the first probe. Wherein when the cooking utensil is positioned on the heating assembly, the first probe and the second probe of the thermocouple electrically contact the cooking utensil such that the cooking utensil electrically closes the thermocouple to form a sensing junction at the cooking utensil.

In a second exemplary embodiment, a cooktop appliance is provided. The cooktop appliance includes a heating assembly having a heating element for applying heat to a cooking utensil formed of an electrically conducting material. The cooktop appliance also includes a thermocouple. The thermocouple includes a first probe formed of a first electrically conducting material. The thermocouple also includes a second probe spaced from the first probe and formed of a second electrically conducting material that is different than the first electrically conducting material of the first probe. Further, the cooktop appliance also includes a measurement device for measuring a voltage differential produced by the thermocouple when the heating element applies heat to the cooking utensil and the first probe and the second probe of the thermocouple electrically contact the cooking utensil to electrically close the thermocouple.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
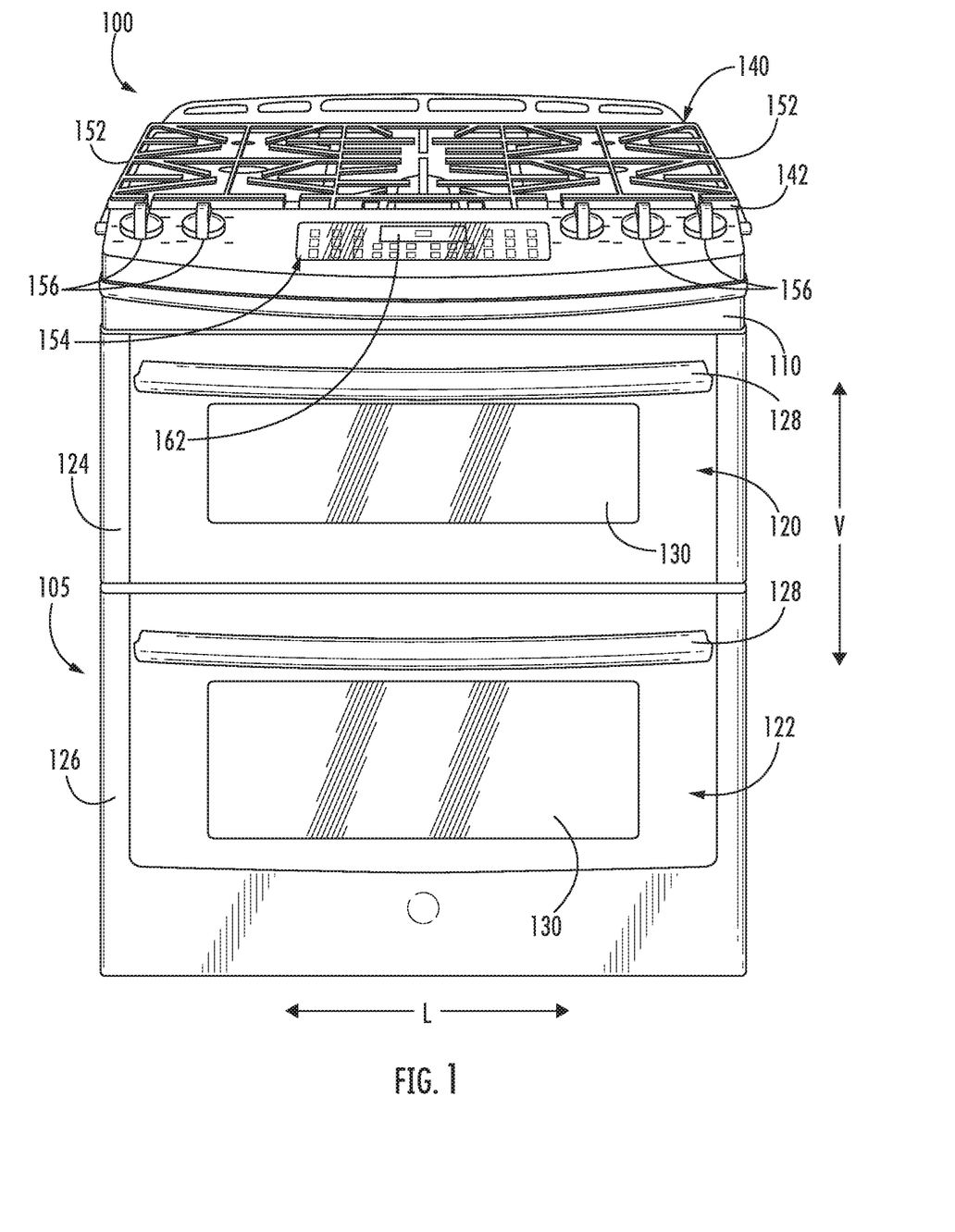
FIG. 1 provides a front, perspective view of a forced aspiration gas range appliance according to an exemplary embodiment of the present subject matter.
Figure 2:
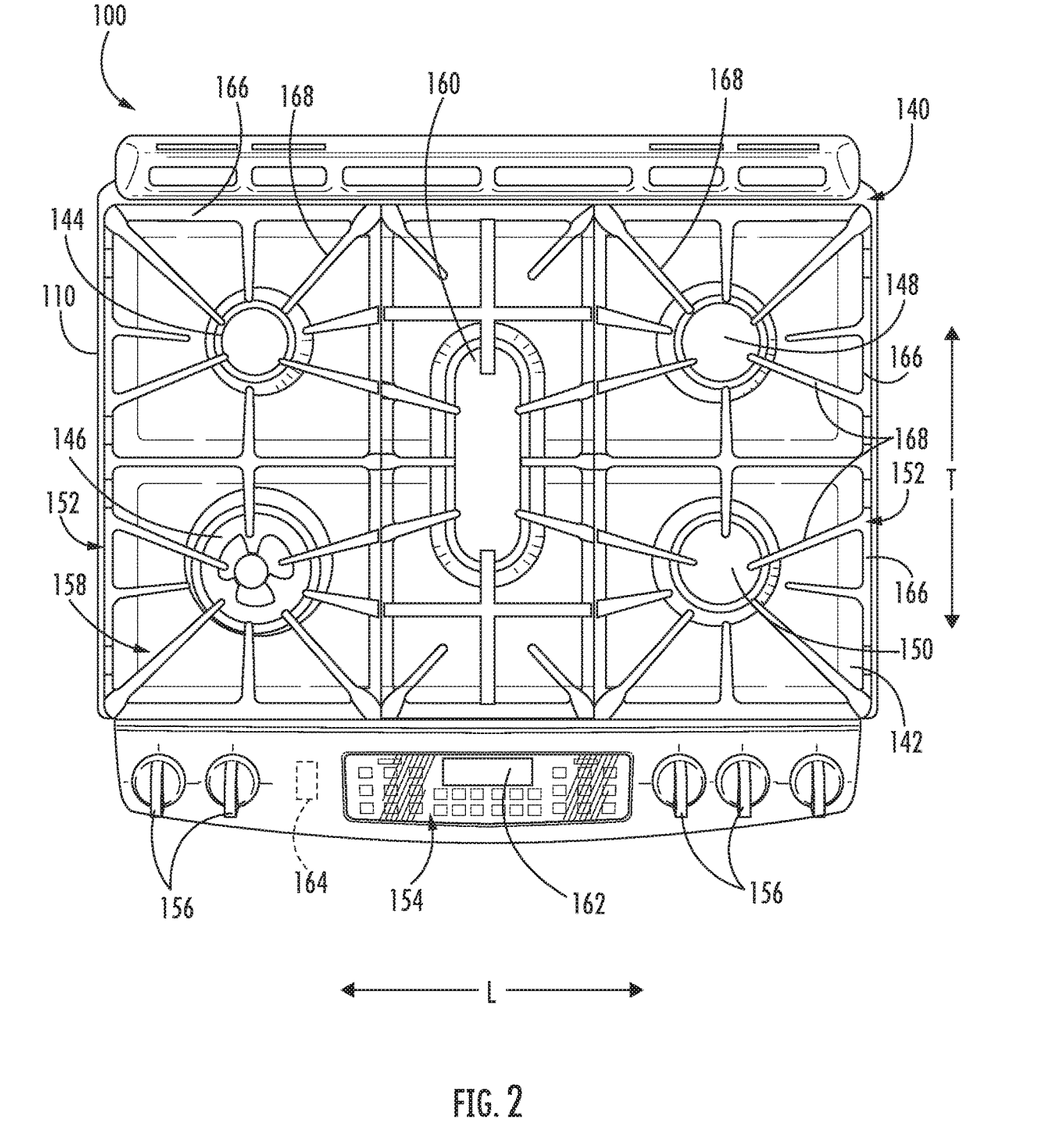
FIG. 2 provides a top, plan view of the exemplary forced aspiration gas range appliance of FIG. 1 and a burner assembly of the exemplary forced aspiration gas range appliance.

FIGS. 1 and 2 provide views of an exemplary cooking appliance as may be employed with the present subject matter. In particular, FIG. 1 provides a front, perspective view of the cooking appliance and FIG. 2 provides a top, plan view of the cooking appliance. For this embodiment, the cooking appliance is a range appliance and thus will be referred to herein as "range appliance 100." As shown, range appliance 100 includes an oven appliance 105 that has an insulated cabinet 110. Cabinet 110 defines an upper cooking chamber 120 and a lower cooking chamber 122 of oven appliance 105. Thus, range appliance 100 is generally referred to as a double oven range appliance. As will be understood by those skilled in the art, range appliance 100 is provided by way of example only and that the present subject matter may be used in or employed with any suitable appliance, e.g., a single oven range appliance or a standalone cooktop appliance. Thus, the exemplary embodiment shown in FIGS. 1 and 2 is not intended to limit the present subject matter to any particular cooking appliance configuration or arrangement. Further, range appliance 100 defines a vertical direction V, a lateral direction L, and a transverse direction T. The vertical direction V, lateral direction L, and transverse direction T are mutually perpendicular and form an orthogonal direction system.

Upper and lower cooking chambers 120, 122 of oven appliance 105 are configured for the receipt of one or more food items to be cooked. Range appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124, 126 to assist a user with opening and closing doors 124, 126 in order to access cooking chambers 120, 122, respectively. As an example, a user can pull on handle 128 mounted to upper door 124 to open or close upper door 124 and access upper cooking chamber 120. Glass window panes 130 provide for viewing the contents of upper and lower cooking chambers 120, 122 when doors 124, 126 are closed and also assist with insulating upper and lower cooking chambers 120, 122. Heating elements (not shown) of oven appliance 105, such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Range appliance 100 also includes a cooktop 140. Cooktop 140 is positioned at or adjacent a top portion of cabinet 110. Thus, cooktop 140 is positioned above upper and lower cooking chambers 120 and 122 along the vertical direction V. Cooktop 140 includes a top panel 142. By way of example, top panel 142 may be constructed of glass, ceramics, enameled steel, and combinations thereof.

Moreover, as shown best in FIG. 2, range appliance 100 includes a plurality of heating assemblies. For instance, the heating assemblies of range appliance 100 include a plurality of burner assemblies 144, 146, 148, 150, a griddle burner 160, and associated grates 152 onto which a cooking utensil holding food and/or cooking liquids (e.g., oil, water, etc.) may be placed. Gas burner assemblies 144, 146, 148, 150 provide thermal energy to cooking utensils positioned on grates 152. As shown in FIG. 2, burners assemblies 144, 146, 148, 150 can be configured in various sizes so as to provide e.g., for the receipt of cooking utensils (i.e., pots, pans, etc.) of various sizes and configurations and to provide different heat inputs for such cooking utensils. Grates 152 are supported on a top surface 158 of top panel 142. Range appliance 100 also includes a griddle burner 160 positioned at a middle portion of top panel 142 as shown in FIG. 2. A griddle may be positioned on grates 152 and heated with griddle burner 160. Each grate 152 includes an outer frame 166 from which various support members 168 extend. Some of the support members 168 extend radially inward from outer frame 166 toward their respective burner assemblies 144, 146, 148, 150 and griddle burner 160 such that their distal ends are aligned vertically above at least a portion of their respective burner assemblies 144, 146, 148, 150 and griddle burner 160.

A user interface panel 154 is located within convenient reach of a user of range appliance 100. For this exemplary embodiment, user interface panel 154 includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner 160 to a cooking utensil located thereon. User interface panel 154 may also be provided with one or more displays 162 that deliver or communicate certain information to the user, such as e.g., whether a particular burner assembly is activated, the rate at which the burner assembly is set, or as will be explained further below, the temperature of a cooking utensil positioned on one of the burner assemblies 144, 146, 148, 150 and/or griddle burner 160. Display 162 may be a digital or analog display device designed to provide operational feedback to a user. In some embodiments, user interface panel 154 may include other communication devices, such as e.g., a speaker to audibly communicate information to a user. Although shown with knobs 156, it should be understood that knobs 156 and the configuration of range appliance 100 shown in FIGS. 1 and 2 is provided by way of example only. More specifically, user interface panel 154 may include various input components, such as one or more of a variety of touch-type controls, electrical, mechanical or electro-mechanical input devices including rotary dials, push buttons, and touch pads.

Range appliance 100 also includes a controller 164 (FIG. 2), e.g., configured to control one or more operations of range appliance 100. For example, controller 164 may control at least one operation of range appliance 100. Controller 164 may be communicatively coupled (via a suitable wired or wireless connection) with a number of components of range appliance 100, including heating elements of oven appliance 105, burner and griddle assemblies 144, 146, 148, 150, 160, and various components of a user interface panel 154, one or more temperature sensing device(s), as well as other suitable components of range appliance 100. In general, controller 164 is operable to configure range appliance 100 (and various components thereof) for cooking. Such configuration may be based, for instance, on a plurality of selected operating cycles or modes, e.g., as selected at user interface panel 154.

Controller 164 may include one or more memory devices and one or more microprocessors, such as general or special purpose microprocessors operable to execute programming instructions or micro-control code associated with an operating cycle. The memory device (i.e., memory) may represent random access memory such as DRAM, or read only memory such as ROM or FLASH. In some embodiments, the processor executes programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the processing device to perform operations. For certain embodiments, the instructions include a software package configured to operate range appliance 100 and interpret one or more electrical signals. Controller 164 may be positioned in a variety of locations throughout range appliance 100. As illustrated, controller 164 may be located proximate user interface panel 154 of range appliance 100. In such embodiments, input/output ("I/O") signals may be routed between controller 164 and various components of range appliance 100.

In some instances, it may be desirable to sense or measure the temperature of a cooking utensil placed or positioned on one of the burner assemblies 144, 146, 148, 150 and/or griddle burner 160 of cooktop 140. In accordance with exemplary aspects of the present disclosure, exemplary embodiments of a thermocouple temperature sensing device are provided below.

Figure 3:
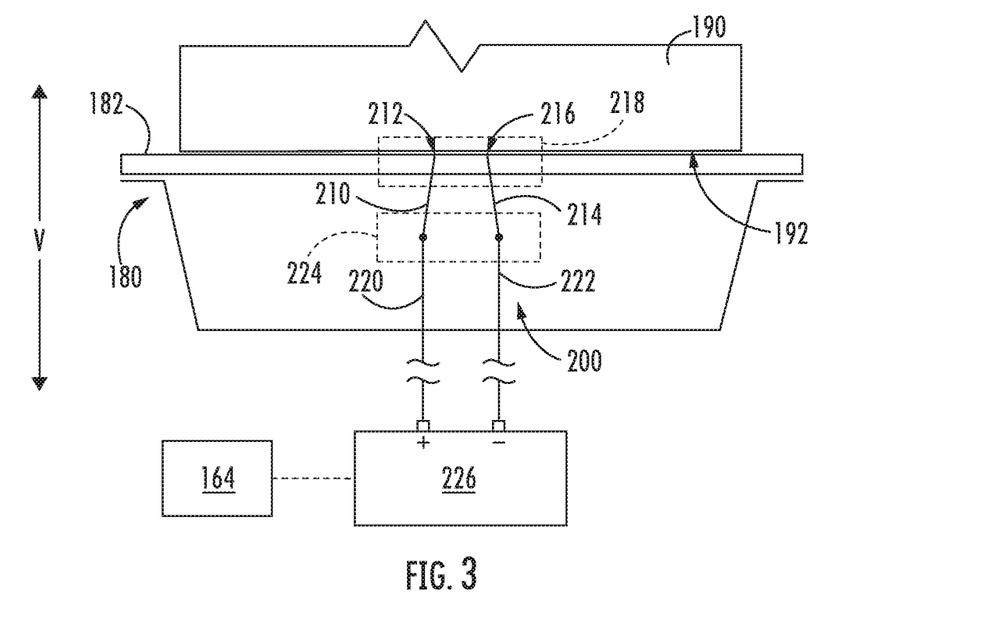
FIG. 3 provides a schematic side view of an exemplary thermocouple for measuring the temperature of a cooking utensil positioned on a heating assembly according to an exemplary embodiment of the present subject matter.

FIG. 3 provides a schematic side view of an exemplary thermocouple 200 configured for measuring the temperature of a cooking utensil 190 positioned on a heating assembly 180 of a cooking appliance, such as e.g., a cooktop appliance or a range appliance having a cooktop appliance. Cooking utensil 190 may be formed of an electrically conducting material. For the depicted embodiment of FIG. 3, heating assembly 180 includes a heating element 182, which in this embodiment is an electric heating element (e.g., an electric resistance coil). As shown, cooking utensil 190 is placed or positioned on heating element 182, e.g., so that heating element 182 may heat cooking utensil 190 and the contents therein. In some embodiments, however, heating assembly 180 may be any suitable heating assembly with any suitable type of heating element. For instance, in some embodiments, the heating element may be an induction heating element, a gas burner, or some other suitable heating element. Moreover, in some embodiments, cooking utensil 190 is positioned on a component other than the heating element itself. For instance, cooking utensil 190 may be placed on a grate of a heating assembly.

As shown in FIG. 3, for this exemplary embodiment, thermocouple 200 includes a first probe 210 formed of a first electrically conducting material. First probe 210 has a tip portion 212 that is positioned to electrically contact cooking utensil 190 when cooking utensil 190 is placed on heating assembly 180. Particularly, tip portion 2121 of first probe 210 is positioned to electrically contact a bottom surface 192 of cooking utensil 190. Thermocouple 200 also includes a second probe 214 spaced from first probe 210, e.g., horizontally (i.e., a direction orthogonal to the vertical direction V). In some embodiments, first probe 210 is spaced from second probe 214 less than three (3) inches, e.g., spaced less than three (3) inches horizontally (i.e., in a direction orthogonal to the vertical direction V). Moreover, like first probe 210, second probe 214 has a tip portion 216 that is positioned to electrically contact bottom surface 192 of cooking utensil 190 when cooking utensil 190 is placed on heating assembly 180. Second probe 214 is formed of a second electrically conducting material that is different than the first electrically conducting material of first probe 210. Accordingly, first probe 210 and second probe 214 are formed of dissimilar electrically conducting materials. As one example, first probe 210 may be formed of nickel-chromium and second probe 214 may be formed of nickel-alumel. As another example, first probe 210 may be formed of iron and second probe 214 may be formed of constantan. In some embodiments, suitable combinations of the above materials may be employed. Other suitable electrically conducting materials may be employed as well, such as other nickel-alloy thermocouples.

First probe 210 is electrically connected with extension or first lead-out wire 220 at a reference junction 224 of the thermocouple circuit and second probe 214 is electrically connected with extension or second lead-out wire 222 at reference junction 224. Lead-out wires 220, 222 may be formed of copper or another suitable electrically conducting material, for example. As depicted, lead-out wires 220, 222 extend to a measurement device 226 (e.g., a voltmeter) that is operatively configured to measure the open circuit voltage of thermocouple 200 caused due to the thermoelectric or Seebeck effect as will be explained further below.

Notably, when cooking utensil 190 is positioned on heating assembly 180 as shown in FIG. 3, first probe 210 and second probe 214 of thermocouple 200 electrically contact cooking utensil 190 such that cooking utensil 190 electrically closes thermocouple 200 (i.e., the thermocouple circuit) to form a sensing junction 218 at cooking utensil 190. That is, when cooking utensil 190 is placed on heating assembly 180 and first probe 210 and second probe 214 electrically contact bottom surface 192 of the electrically conducting cooking utensil 190, the cooking utensil 190 acts as an intermediate material to close or complete the thermocouple circuit. Consequently, when heating element 182 of heating assembly 180 applies or imparts thermal energy (i.e., heat) electric current may flow between first probe 210 and second probe 214 and thus a voltage differential is produced between first and second probes 210, 214 as they are formed of dissimilar materials. The produced voltage may be measured by measurement device 226, e.g., at reference junction 224. As will be appreciated, the produced voltage or differential is proportional to the difference in temperature between the hot or sensing junction 218 and reference junction 224.

The measured voltage may be routed to controller 164 or another suitable processing device so that the measured voltage can be correlated to a temperature of cooking utensil 190. For instance, controller 164 may be configured to receive one or more signals indicative of the temperature of cooking utensil 190 from thermocouple 200. For instance, as noted above, the signals may be a voltage output of thermocouple 200. Controller 164 may receive the one or more signals directly from measurement device 226 of thermocouple 200 or may receive the one or more signals indirectly. For instance, in some embodiments, a signal conditioning circuit may condition the signals prior to the signals being received by controller 164. Once the one or more signals are received by controller 164, controller 164 is configured to determine a temperature of the cooking utensil based at least in part on the one or more signals indicative of the temperature of cooking utensil 190. As one example, controller 164 may correlate the measured voltage with an associated temperature by utilizing a lookup table. After the temperature of cooking utensil 190 is determined, controller 164 is configured to output the temperature of cooking utensil 190. For instance, controller 164 may output the temperature of cooking utensil 190 to a communication device, such as e.g., display 162 (FIGS. 1 and 2), a speaker of the cooking appliance, an electronic user device (e.g., a cellphone), some combination thereof, etc. In this way, the communication device may present the temperature output by controller 164 to a user.

Figure 4:
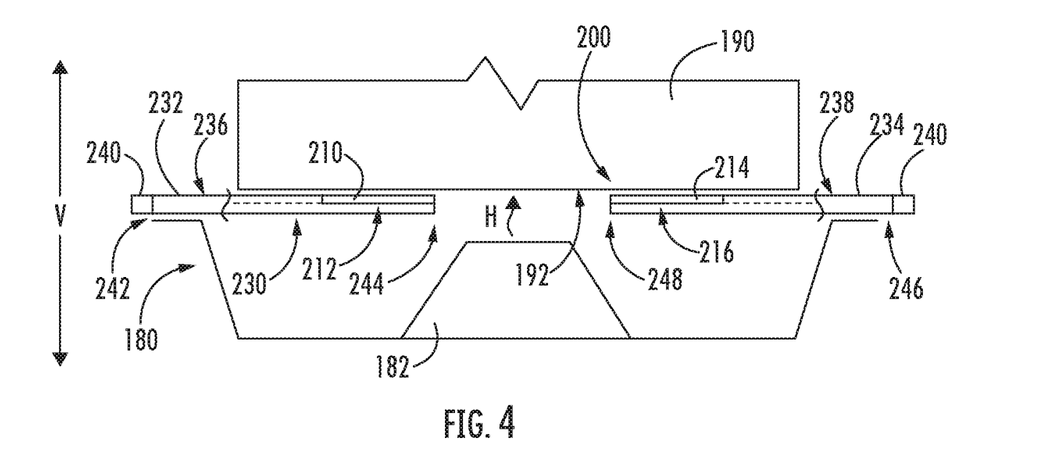
FIG. 4 provides a schematic side view of one exemplary thermocouple for measuring the temperature of a cooking utensil positioned on a heating assembly according to an exemplary embodiment of the present subject matter.

FIG. 4 provides a schematic side view of one exemplary embodiment of thermocouple 200 for measuring the temperature of cooking utensil 190 positioned on heating assembly 180. The heating assembly 180 of FIG. 4 may be one of the heating assemblies of range appliance 100 of FIGS. 1 and 2, for example. Thermocouple 200 of FIG. 4 may function in a similar manner as the thermocouple 200 described above and illustrated in FIG. 3 and may be similarly configured except as provided below.

For this embodiment, heating assembly 180 includes heating element 182 (e.g., one of the gas burner assemblies 144, 146, 148, 150, 160 of range appliance 100 of FIGS. 1 and 2) and a grate 230 (e.g., one of the grates 152 of range appliance 100 of FIGS. 1 and 2) having a first support member 232 and a second support member 234. As depicted, first probe 210 is embedded within or attached to first support member 232 of grate 230 and second probe 214 is embedded within or attached to second support member 234 of grate 230. Specifically, for this embodiment, tip portion 212 of first probe 210 is positioned on a top surface 236 of first support member 232 and tip portion 216 of second probe 214 is positioned on a top surface 238 of second support member 234. In this way, first probe 210 and second probe 214 electrically contact bottom surface 192 of cooking utensil 190 when cooking utensil 190 is placed on grate 230 of heating assembly 180, e.g., as shown in FIG. 4.

As further shown in FIG. 4, grate 230 has an outer frame 240 from which first support member 232 and second support member 234 extend. First support member 232 extends from outer frame 240 between a proximal end 242 that connects first support member 232 and outer frame 240 and a distal end 244 aligned vertically above at least a portion of heating element 182. Similarly, second support member 234 extends from outer frame 240 between a proximal end 246 that connects second support member 234 and outer frame 240 and a distal end 248 aligned vertically above at least a portion of heating element 182. As shown, tip portion 212 of first probe 210 is positioned at or proximate distal end 244 of first support member 232 and tip portion 216 of second probe 214 is positioned at or proximate distal end 248 of second support member 234. By positioning first probe 210 and second probe 214 in this manner, thermocouple 200 may sense or measure one of the warmest areas of the thermal gradient of cooking utensil 190 positioned on grate 230 during cooking.

When cooking utensil 190 is positioned on grate 230 and heat is applied to cooking utensil 190 by heating element 182 as shown in FIG. 4 (as shown by arrow H), first probe 210 and second probe 214 of thermocouple 200 electrically contact bottom surface 192 of cooking utensil 190. When this occurs, cooking utensil 190 acts as an intermediate material and electrically closes thermocouple 200 (i.e., the thermocouple circuit) to form a sensing junction at bottom surface 192 of cooking utensil 190. Consequently, when heating element 182 of heating assembly 180 applies heat H to cooking utensil 190, electric current may flow between first probe 210 and second probe 214 and thus a voltage is produced between first and second probes 210, 214 as they are formed of dissimilar materials. The produced voltage may be measured by measurement device 226 (FIG. 3; not shown in FIG. 4), e.g., at a reference junction. As will be appreciated, the produced voltage or differential is proportional to the difference in temperature between the hot or sensing junction and reference junction. The voltage differential may be processed and presented as described above.

In some alternative embodiments, first probe 210 and second probe 214 may be embedded within or attached to a single support member of grate 230 instead of being embedded within or attached to separate support members of grate 230, e.g., as shown in FIG. 4. As one example, first probe 210 and second probe 214 may both be embedded within or attached to first support member 232. As another example, first probe 210 and second probe 214 may both be embedded within or attached to second support member 234 of grate 230. Notably, in such embodiments, first and second probes 210, 214 are spaced from one another, e.g., in a direction orthogonal to the vertical direction V. Advantageously, in such embodiments, only a single support member of grate 230 need be altered to include electrical components.

Figure 5:
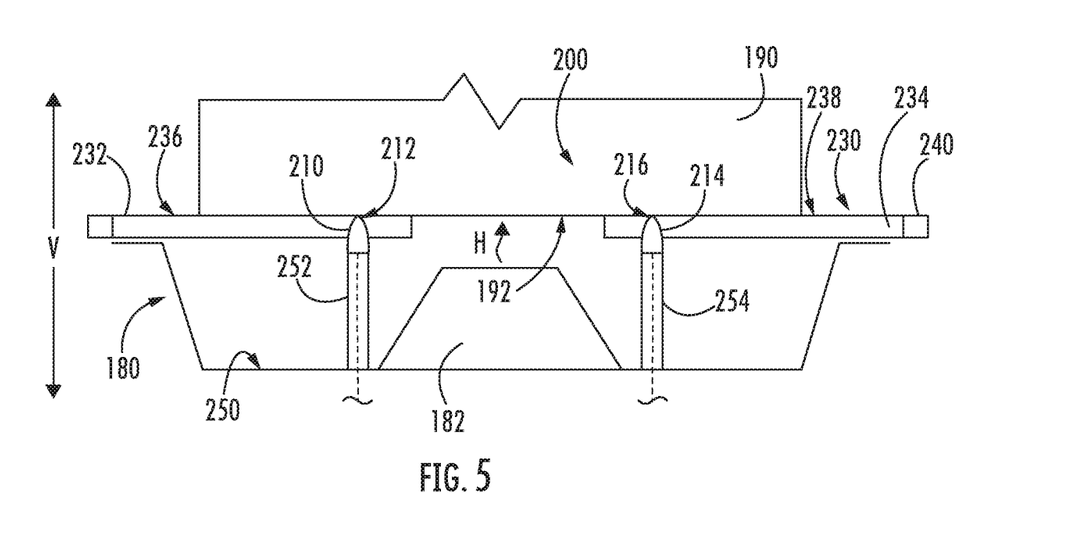
FIG. 5 provides a schematic side view of another exemplary thermocouple for measuring the temperature of a cooking utensil positioned on a heating assembly according to an exemplary embodiment of the present subject matter.

FIG. 5 provides a schematic side view of another exemplary embodiment of thermocouple 200 for measuring the temperature of cooking utensil 190 positioned on heating assembly 180. The heating assembly 180 may be one of the heating assemblies of range appliance 100 of FIGS. 1 and 2, for example. Thermocouple 200 of FIG. 5 may function in a similar manner as the thermocouple 200 described above and illustrated in FIG. 3 and may be similarly configured except as provided below.

For this embodiment, the cooking appliance includes a top panel 250, which may be, for example, top panel 142 of cooktop 140 of the range appliance 100 of FIGS. 1 and 2. Further, for the depicted embodiment of FIG. 5, a first tower 252 and a second tower 254 extend from top panel 250. Specifically, the sheaths or first and second towers 252, 254 extend vertically from top panel 250 upwards toward grate 230 of heating assembly 180, e.g., along the vertical direction V. In some embodiments, first tower 252 and second tower 254 are formed of an electrically conducting material that is dissimilar from their associated first and second probes 210, 214.

As depicted in FIG. 5, first tower 252 positions first probe 210 so that first probe 210 electrically contacts cooking utensil 190 when cooking utensil 190 is positioned on heating assembly 180, e.g., on grate 230 supported on top panel 250. Similarly, second tower 254 positions second probe 214 so that second probe 214 electrically contacts cooking utensil 190 when cooking utensil 190 is positioned on heating assembly 180. Particularly, for this embodiment, first tower 252 positions first probe 210 and second tower 254 positions second probe 214 such that their respective tip portions 212, 216 are coplanar with one another. Further, in some embodiments, tip portions 212, 216 of first and second probes 210, 214 are coplanar with the top surfaces of the support members of grate 230, e.g., top surface 236 of first support member 232 and top surface 238 of second support member 234. Accordingly, when cooking utensil 190 is placed on grate 230 of heating assembly 180, bottom surface 192 of cooking utensil 190 is contacted by both first probe 210 and second probe 214.

In some exemplary embodiments, one or both of first probe 210 and second probe 214 are movable along the vertical direction V by respective or a single actuation mechanism. For instance, an actuation mechanism may retract first probe 210 within first tower 252 or extend first probe 210 vertically upward to engage or electrically contact bottom surface 192 of cooking utensil 190. Similarly, an actuation mechanism may retract second probe 214 within second tower 254 or extend second probe 214 vertically upward to engage or electrically contact bottom surface 192 of cooking utensil 190. The actuation mechanisms may be located within their respective towers 252, 254 or beneath the top panel 250, among other suitable locations. Advantageously, in such embodiments, first and second probes 210, 214 may electrically contact a cooking utensil having a nonplanar bottom surface, e.g., having a curved or arcuate bottom surface.

As will be appreciated, the exemplary thermocouple 200 of FIG. 5 may sense the temperature of cooking utensil 190 placed on heating assembly 180 in a similar manner described above. In addition, the voltage differential produced by the thermocouple circuit may be processed and presented as described above.

Figure 6:
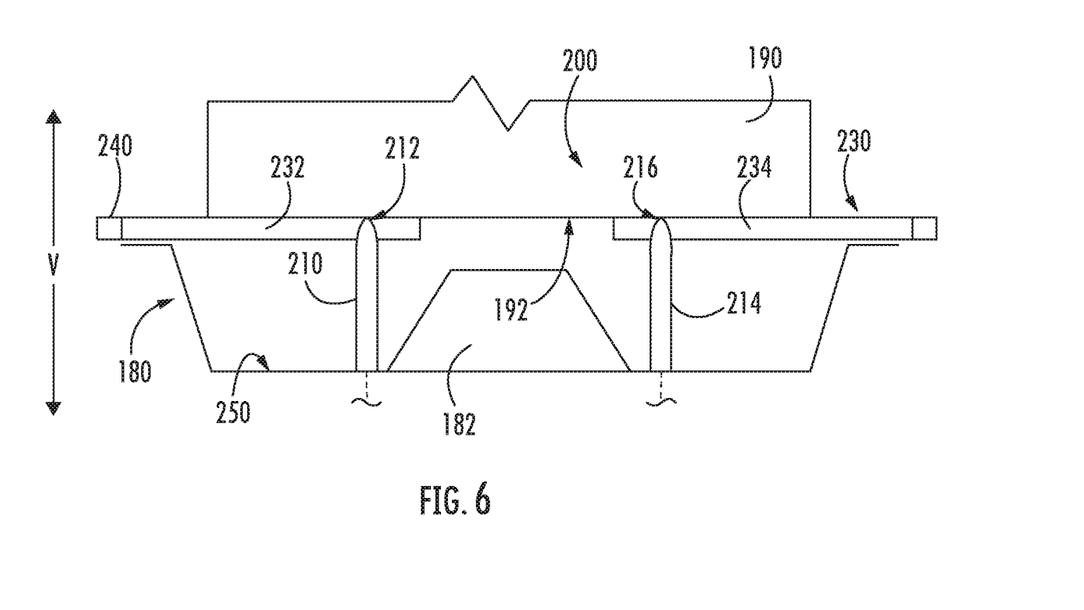
FIG. 6 provides a schematic side view of yet another exemplary thermocouple for measuring the temperature of a cooking utensil positioned on a heating assembly according to an exemplary embodiment of the present subject matter.

FIG. 6 provides a schematic side view of an alternative exemplary embodiment of thermocouple 200. Thermocouple 200 of FIG. 6 may function in a similar manner as the thermocouple 200 described above and illustrated in FIG. 3 and may be similarly configured except as provided below. As shown in the depicted embodiment of FIG. 6, first probe 210 and second probe 214 each extend vertically from top panel 250 so that first probe 210 and second probe 214 electrically contact cooking utensil 190 when the cooking utensil 190 is positioned on the heating assembly 180, e.g., on grate 230 as shown in FIG. 6. Accordingly, for this embodiment, first probe 210 and second probe 214 are not carried or supported by first and second towers 252, 254, respectively. In some embodiments, one or both of first probe 210 and second probe 214 are movable along the vertical direction V, e.g., by respective or a single actuation mechanism.

As will be appreciated, the exemplary thermocouple 200 of FIG. 6 may sense the temperature of cooking utensil 190 placed on heating assembly 180 in a similar manner described above. In addition, the voltage differential produced by the thermocouple circuit may be processed and presented as described above.

Figure 7:
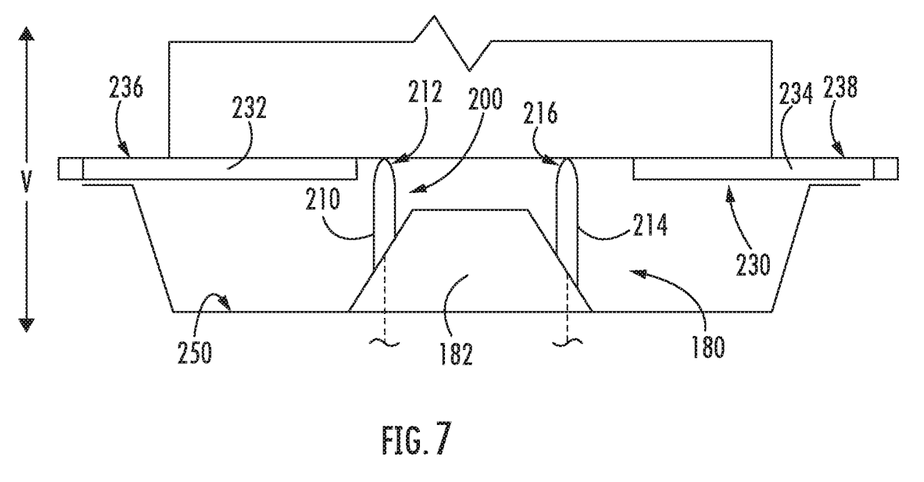
FIG. 7 provides a schematic side view of yet another exemplary thermocouple for measuring the temperature of a cooking utensil positioned on a heating assembly according to an exemplary embodiment of the present subject matter.

FIG. 7 provides a schematic side view of yet another exemplary embodiment of thermocouple 200 for measuring the temperature of cooking utensil 190 positioned on heating assembly 180. Heating assembly 180 of FIG. 4 may be one of the heating assemblies of range appliance 100 of FIGS. 1 and 2, for example. Thermocouple 200 of FIG. 7 may function in a similar manner as the thermocouple 200 described above and illustrated in FIG. 3 and may be similarly configured except as provided below.

For this embodiment, heating element 182 is a gas burner, such as one of the gas burner assemblies 144, 146, 148, 150 or griddle burner 160 of range appliance 100 of FIGS. 1 and 2. As shown, for this embodiment, first probe 210 and second probe 214 extend vertically from gas burner so that tip portion 212 of first probe 210 and tip portion 216 of second probe 214 electrically contact cooking utensil 190 when cooking utensil 190 is positioned on heating assembly 180 (e.g., on grate 230). By extending first and second probe 210, 214 from heating element 182, which in this embodiment is a gas burner, the tip portions 212, 216 of the first and second probes 210, 214 are positioned close together, which may provide enhanced accuracy of the temperature readings of thermocouple 200. Although not shown, in some embodiments, first probe 210 and second probe 214 may be supported by a first and second tower, respectively. Moreover, in some embodiments, first and second probes 210, 214 may be movable along the vertical direction V, e.g., in a manner described above.

Moreover, as will be appreciated, the exemplary thermocouple 200 of FIG. 7 may sense the temperature of cooking utensil 190 placed on heating assembly 180 in a similar manner described above. In addition, the voltage differential produced by the thermocouple circuit may be processed and presented as described above.

Figure 8:
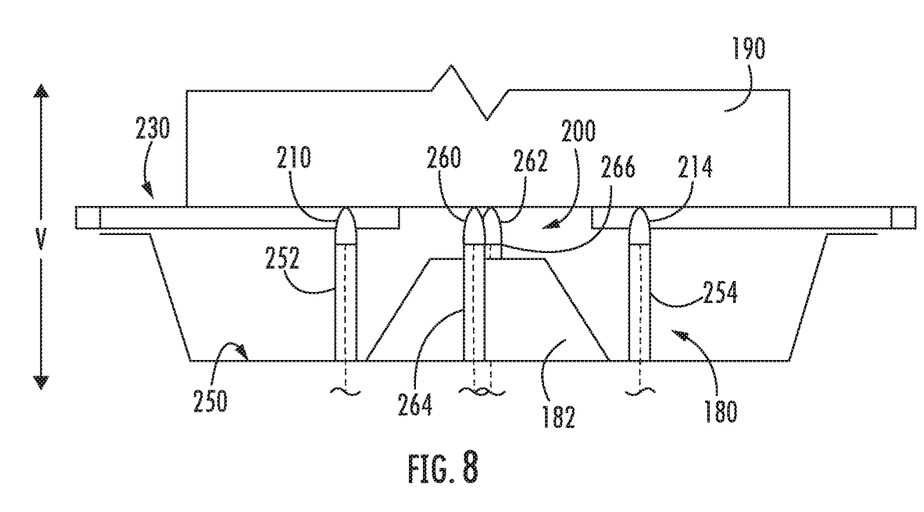
FIG. 8 provides a schematic side view of yet another exemplary thermocouple for measuring the temperature of a cooking utensil positioned on a heating assembly according to an exemplary embodiment of the present subject matter.

FIG. 8 provides a schematic side view of another exemplary embodiment of thermocouple 200 for measuring the temperature of cooking utensil 190 positioned on heating assembly 180. The heating assembly 180 of FIG. 8 may be one of the heating assemblies of range appliance 100 of FIGS. 1 and 2. Alternatively, heating assembly 180 may be another suitable type of heating assembly, e.g., a heating assembly that includes an electric resistance heating element or an induction heating element.

For this embodiment, thermocouple 200 includes multiple pairs of probes. Particularly, thermocouple 200 includes a first pair of probes, including first and second probes 210, 214, and a second pair of probes, including a third probe 260 and a fourth probe 262. Third probe 260 is formed of a third electrically conducting material and fourth probe 262 is formed of a fourth electrically conducting material that is different than the third electrically conducting material of third probe 260. The first and second pairs of probes each have an associated thermocouple circuit, e.g., that may be connected with measurement device 226. Each circuit of thermocouple 200 may function in a similar manner as the thermocouple 200 described above and illustrated in FIG. 3.

As further depicted in FIG. 8, the third and fourth probes 260, 262 are supported and positioned by a third and fourth tower 264, 266, respectively. The towers 252, 254, 264, 266 position the probes 210, 214, 260, 262 such that their respective tip portions are coplanar in a plane orthogonal to the vertical direction V. Accordingly, when cooking utensil 190 is placed on grate 230 of heating assembly 180, bottom surface 192 of cooking utensil 190 is contacted by first probe 210 and second probe 214 as well as third probe 260 and fourth probe 262. In some alternative embodiments, first, second, third, and fourth probes 210, 214, 260, 262 may extend directly from top panel 250 (i.e., without being supported by their respective towers), or alternatively, first, second, third, and fourth probes 210, 214, 260, 262 may extend directly from heating element 182, e.g., in a similar manner as shown in FIG. 7.

Advantageously, multiple temperature readings of cooking utensil 190 may be taken with multiple thermocouple circuits of thermocouple 200. For instance, in the embodiment of FIG. 8, two distinct temperature readings may be taken. The first pair of probes (e.g., first and second probes 210, 214) may take a first temperature reading and the second pair of probes (e.g., third and fourth probes 260, 262) may take a second temperature reading. The temperature readings may both be measured by measurement device 226 (FIG. 3) and the output voltages may be compared by controller 164. The two temperatures may be displayed, combined into an average temperature and presented to the user, or in the instances where the temperature differential between the two readings exceeds a predetermined threshold, controller may set a flag and communicate a hardware failure indicating that thermocouple 200 or one of the circuits thereof have malfunctioned.

Figure 9:
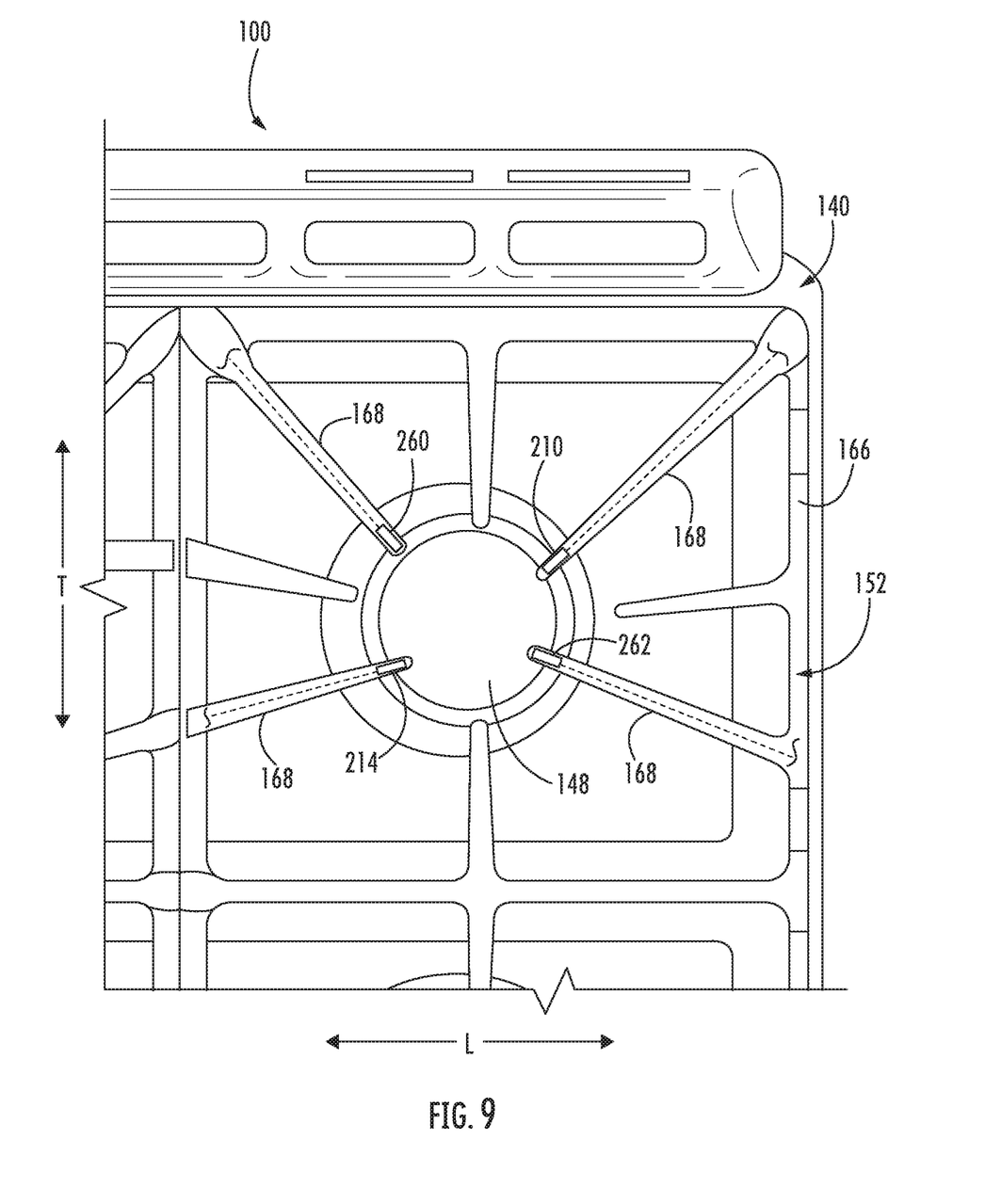
FIG. 9 provides a schematic side view of yet another exemplary thermocouple for measuring the temperature of a cooking utensil positioned on a heating assembly according to an exemplary embodiment of the present subject matter.

FIG. 9 provides a top plan view of yet another exemplary embodiment of thermocouple 200 for measuring the temperature of cooking utensil 190 positioned on heating assembly 180. The heating assembly 180 of FIG. 9 is shown as one of the heating assemblies of range appliance 100 of FIGS. 1 and 2. Thermocouple 200 of FIG. 9 may function in a similar manner as the thermocouple 200 of FIG. 3 and may be similarly configured except as provided below.

For this embodiment, the heating element of heating assembly is gas burner assembly 148 of range appliance 100 of FIGS. 1 and 2 and the grate is grate 152 of range appliance 100. As shown, thermocouple 200 includes first probe 210, second probe 214, third probe 260, and fourth probe 262 each embedded within or attached to one of the support members 168 of grate 152. Notably, each of the probes 210, 214, 260, 262 is positioned at a distal end of their respective support members 168. In this way, the probes 210, 214, 260, 262 are optimally positioned to sense the temperature of a cooking utensil placed on grate 152. The probes 210, 214, 260, 262 may be positioned along the top surfaces of the their respective support members 168 and the electrical wires may be attached to or embedded within the support members 168, e.g., to protect the wires. Advantageously, like the embodiment of FIG. 8, the thermocouple 200 of FIG. 9 may take multiple temperature readings of cooking utensil 190.

The various embodiments of thermocouple 200 described herein and illustrated in the figures have a number of advantages and benefits. For instance, the thermocouple described herein eliminates the cost and complexity associated with sensors that are embedded within cooking utensils that utilize radio transmitters. The thermocouple herein also has a much faster response, e.g., compared to external sensors. Additionally, another advantage of the thermocouple described and illustrated herein is that there is no need for a separate sensor that could be heated independently of the cooking utensil and give inaccurate temperature readings. This is especially true for gas or radiant type cooking scenarios where an external heat source is used to heat the cooking utensil in contrast to induction heating methods where the heating element directly heats the cooking utensil. Accordingly, the thermocouple temperature measurement system provided herein more accurately measures cookware temperature regardless of the heating method.

In addition, in some embodiments, the thermocouples described herein may be utilized for detection of a cooking utensil placed on a heating assembly, e.g., for fire prevention and conservation of energy. For instance, in some embodiments, a controller communicatively coupled with the thermocouple is configured to receive one or more signals indicative of whether the thermocouple is open or closed. When the thermocouple or circuit of the thermocouple is closed, controller determines that a cooking utensil is currently positioned on the heating assembly. On the other hand, if the thermocouple circuit is open, the controller determines that a cooking utensil is not currently positioned on the heating assembly. If a heating element of the heating assembly is turned to an "on" position and no cooking utensil is placed on the heating assembly, a safety issue may result. Thus, the controller is further configured to control the heating element to switch to an "off" position if the thermocouple is open for a predetermined time. The predetermined time may be five minutes or another suitable time, for example. Accordingly, the thermocouples described herein may be utilized to control operation of a cooking appliance in a safe manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance, comprising:
    a heating assembly having a heating element for heating a cooking utensil formed of an electrically conducting material; and
    a thermocouple, comprising:
        a first probe formed of a first electrically conducting material; and
        a second probe spaced from the first probe and formed of a second electrically conducting material that is different than the first electrically conducting material of the first probe;
    wherein when the cooking utensil is positioned on the heating assembly, the first probe and the second probe of the thermocouple electrically contact the cooking utensil such that the cooking utensil electrically closes the thermocouple to form a sensing junction at the cooking utensil.

2. The cooking appliance of claim 1, wherein the cooking appliance further comprises:
    a top panel, wherein the first probe and the second probe extend vertically from the top panel so that the first probe and the second probe electrically contact the cooking utensil when the cooking utensil is positioned on the heating assembly.

3. The cooking appliance of claim 1, wherein the first probe and the second probe each have a tip portion and wherein the heating element is a gas burner, and wherein the first probe and the second probe extend vertically from the gas burner so that the tip portion of the first probe and the tip portion of the second probe electrically contact the cooking utensil when the cooking utensil is positioned on the heating assembly.

4. The cooking appliance of claim 1, wherein the cooking appliance is a cooktop appliance.

5. The cooking appliance of claim 1, wherein the first probe is spaced from the second probe less than three (3) inches.

6. The cooking appliance of claim 1, further comprising:
    a controller communicatively coupled with the thermocouple, the controller configured to:
        receive one or more signals from the thermocouple;
        determine a temperature of the cooking utensil based at least in part on the one or more signals; and
        output the temperature of the cooking utensil.

7. The cooking appliance of claim 6, further comprising:
    a communication device for presenting the temperature output by the controller to a user.

8. The cooking appliance of claim 1, wherein the heating assembly further comprises:
    a grate having a first support member and a second support member, and wherein the first probe is embedded within or attached to the first support member of the grate and the second probe is embedded within or attached to the second support member of the grate.

9. The cooking appliance of claim 8, wherein the first probe and the second probe each have a tip portion and wherein the first support member has a top surface and the second support member has a top surface, and wherein the tip portion of the first probe is positioned on the top surface of the first support member and the tip portion of the second probe is positioned on the top surface of the second support member.

10. The cooking appliance of claim 8, wherein the first probe and the second probe each have a tip portion, and wherein the grate has an outer frame from which the first support member and the second support member extend, and wherein the first support member extends from the outer frame between a proximal end that connects the first support member and the outer frame and a distal end aligned vertically above at least a portion of the heating element and the second support member extends from the outer frame between a proximal end that connects the second support member and the outer frame and a distal end aligned vertically above at least a portion of the heating element, and wherein the tip portion of the first probe is positioned at or proximate the distal end of the first support member and the tip portion of the second probe is positioned at or proximate the distal end of the second support member.

11. The cooking appliance of claim 1, wherein the cooking appliance further comprises:
    a top panel;
    a first tower extending from the top panel, wherein the first tower positions the first probe so that the first probe electrically contacts the cooking utensil when the cooking utensil is positioned on the heating assembly; and
    a second tower extending from the top panel, wherein the second tower positions the second probe so that the second probe electrically contacts the cooking utensil when the cooking utensil is positioned on the heating assembly.

12. The cooking appliance of claim 11, wherein the heating assembly further comprises a grate supported on the top panel, and wherein the cooking utensil is positioned on the grate.

13. The cooking appliance of claim 11, wherein the first probe and the second probe each have a tip portion and wherein the cooking appliance defines a vertical direction, and wherein the first tower positions the first probe and the second tower positions the second probe such that the tip portion of the first probe and the tip portion of the second probe are coplanar in a plane orthogonal to the vertical direction.

14. The cooking appliance of claim 11, wherein the cooking appliance defines a vertical direction, and wherein one or both of the first probe and the second probe are movable along the vertical direction.

15. A cooktop appliance, comprising:
    a heating assembly having a heating element for applying heat to a cooking utensil formed of an electrically conducting material;
    a thermocouple, comprising:
        a first probe formed of a first electrically conducting material; and
        a second probe spaced from the first probe and formed of a second electrically conducting material that is different than the first electrically conducting material of the first probe; and
    a measurement device for measuring a voltage differential produced by the thermocouple when the heating element applies heat to the cooking utensil and the first probe and the second probe of the thermocouple electrically contact the cooking utensil to electrically close the thermocouple.

16. The cooktop appliance of claim 15, wherein the thermocouple further comprises a first lead-out wire electrically connecting the first probe with the measurement device and a second lead-out wire electrically connecting the second probe with the measurement device.

17. The cooktop appliance of claim 15, wherein the heating assembly further comprises:
    a grate having a first support member and a second support member, and wherein the first probe is embedded within or attached to the first support member of the grate and the second probe is embedded within or attached to the second support member of the grate.

18. The cooktop appliance of claim 15, wherein the thermocouple further comprises:
    a third probe formed of a third electrically conducting material, the third probe spaced from the first and second probes; and
    a fourth probe spaced from the third, first, and second probes and formed of a fourth electrically conducting material that is different than the third electrically conducting material of the third probe.

19. The cooktop appliance of claim 15, further comprising:
    a controller communicatively coupled with the thermocouple, the controller configured to:
        receive one or more signals indicative of whether the thermocouple is open or closed; and
        control the heating element to switch to an off position if the thermocouple is open for a predetermined time.

* * * * *